United States Patent
Coward et al.

(10) Patent No.: US 11,269,375 B2
(45) Date of Patent: Mar. 8, 2022

(54) DOCKING APPARATUS FOR HANDHELD COMPUTER AND MOBILE PAYMENT TERMINAL

(71) Applicant: Walmart Apollo, LLC, Bentonville, AR (US)

(72) Inventors: Daniel Coward, Rogers, AR (US); Nathan McClure, Bentonville, AR (US); Jordon Paul Hoelzeman, Bella Vista, AR (US); Douglas E. Humphrys, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 35 days.

(21) Appl. No.: 16/884,145

(22) Filed: May 27, 2020

(65) Prior Publication Data

US 2020/0379509 A1      Dec. 3, 2020

Related U.S. Application Data

(60) Provisional application No. 62/853,270, filed on May 28, 2019.

(51) Int. Cl.
| | |
|---|---|
| G06F 1/16 | (2006.01) |
| G06Q 20/20 | (2012.01) |
| G06K 7/08 | (2006.01) |
| F16B 1/00 | (2006.01) |
| H01F 7/02 | (2006.01) |
| A45F 5/00 | (2006.01) |
| A47F 9/04 | (2006.01) |

(52) U.S. Cl.
CPC .............. *G06F 1/1613* (2013.01); *A45F 5/00* (2013.01); *A47F 9/04* (2013.01); *F16B 1/00* (2013.01); *G06K 7/087* (2013.01); *G06Q 20/204* (2013.01); *H01F 7/02* (2013.01); *A45F 2005/008* (2013.01); *A45F 2200/0525* (2013.01); *A47F 2009/041* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,319,097 | A * | 3/1982 | Liautaud | B60R 11/0247 381/365 |
| 6,137,675 | A * | 10/2000 | Perkins | G06F 1/163 361/679.03 |
| 6,888,940 | B1 * | 5/2005 | Deppen | B60R 11/0241 379/446 |
| 7,374,142 | B2 | 5/2008 | Carnevali | |
| 8,317,067 | B2 | 11/2012 | Lewis | |
| 8,688,037 | B2 | 4/2014 | Chatterjee et al. | |

(Continued)

*Primary Examiner* — Monica E Millner

(57) ABSTRACT

A connectivity sled for docking and undocking a mobile computer and a payment device, comprises a first adapter plate assembly directly coupled to the payment device, including a configuration that couples to a surface of the payment device is exposes all ports, function keys, and interfaces of the payment device and at least one magnet. The sled further comprising a second adapter plate assembly directly coupled to the mobile computer, including a first portion that couples to a top surface of the mobile computer device, and at least one magnet that magnetically couples to the at least one magnet of the first adapter plate assembly.

18 Claims, 16 Drawing Sheets

(56) References Cited

U.S. PATENT DOCUMENTS

| | | | |
|---|---|---|---|
| 8,936,222 B1* | 1/2015 | Bastian | H04B 1/3877 |
| | | | 248/206.5 |
| 8,950,680 B2 | 2/2015 | Yuzon et al. | |
| 9,083,111 B2 | 7/2015 | Riering-Czekalla et al. | |
| 9,300,081 B2 | 3/2016 | Rudisill et al. | |
| 9,436,226 B2* | 9/2016 | Chen | G06F 1/1628 |
| 9,558,482 B2* | 1/2017 | Hicks | G06Q 20/208 |
| 9,894,192 B2 | 2/2018 | Cox, III | |
| 10,237,384 B2* | 3/2019 | Holder | B60R 11/0241 |
| 10,397,677 B1* | 8/2019 | Walter | H04R 1/025 |
| 2008/0164267 A1 | 7/2008 | Huber | |
| 2009/0034169 A1* | 2/2009 | Richardson | G06F 1/1632 |
| | | | 361/679.01 |
| 2011/0064401 A1* | 3/2011 | Desorbo | G03B 17/00 |
| | | | 396/419 |
| 2011/0192857 A1* | 8/2011 | Rothbaum | F16M 11/041 |
| | | | 220/694 |
| 2014/0287801 A1* | 9/2014 | Ho | H04B 1/3888 |
| | | | 455/573 |
| 2015/0320168 A1* | 11/2015 | Hoffman | A45C 11/00 |
| | | | 206/37 |
| 2016/0192752 A1* | 7/2016 | Lach | H04B 1/3888 |
| | | | 206/45.2 |
| 2017/0026498 A1* | 1/2017 | Goldfain | A45C 15/00 |
| 2017/0183052 A1* | 6/2017 | Whitten | F16B 1/00 |
| 2020/0058008 A1* | 2/2020 | Hicks | G07G 1/0081 |

* cited by examiner

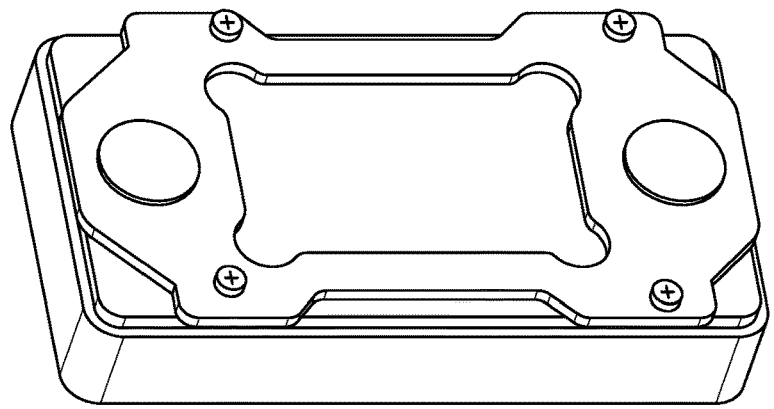
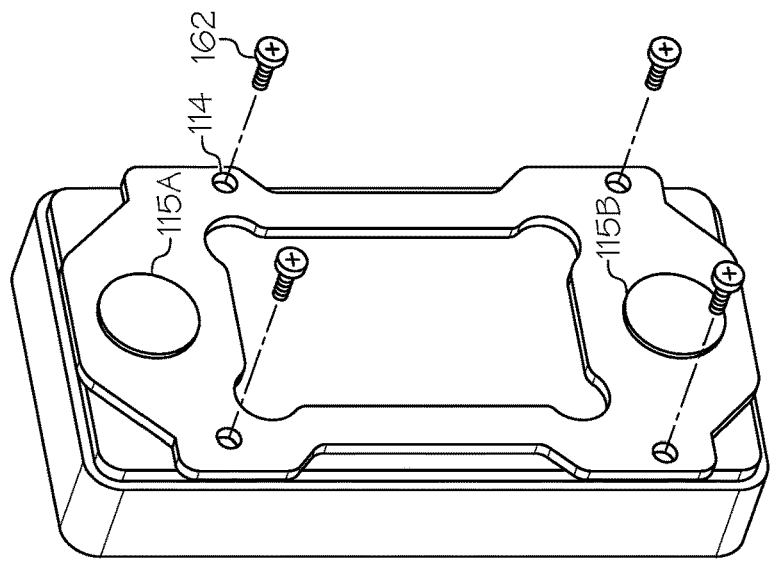
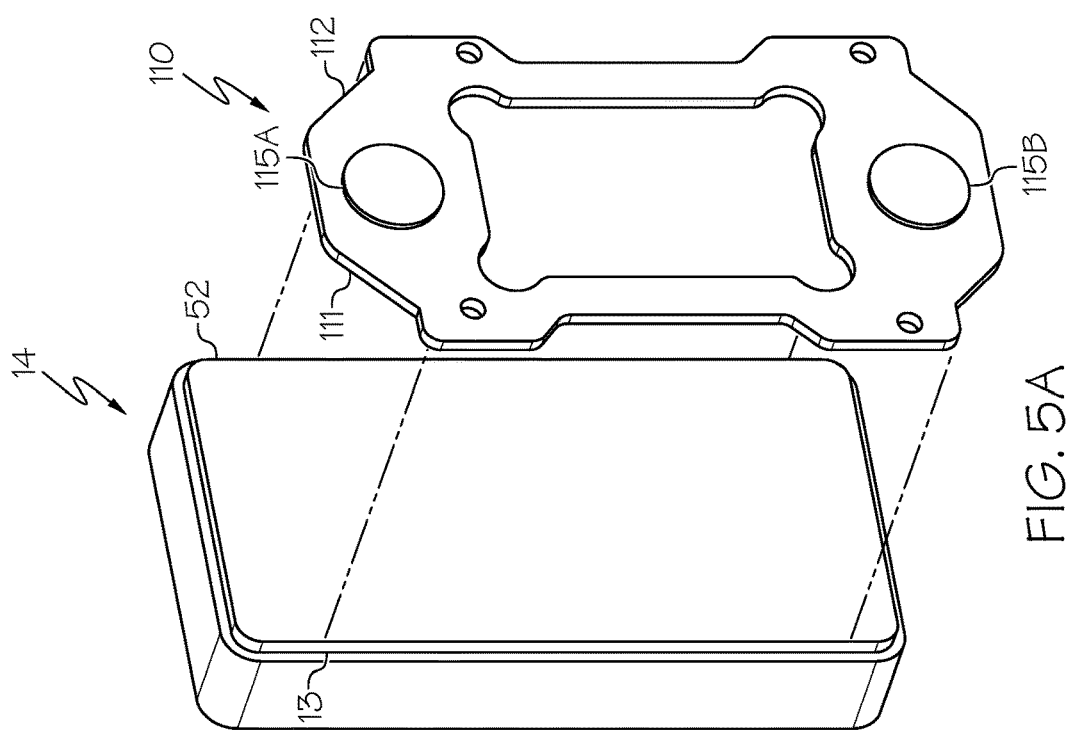

DOCKING APPARATUS FOR HANDHELD COMPUTER AND MOBILE PAYMENT TERMINAL

RELATED APPLICATIONS

This invention claims priority to U.S. provisional patent application Ser. No. 62/853,270, filed May 28, 2019 and entitled "Docking Apparatus for Handheld Computer and Mobile Payment Terminal", which is incorporated herein in its entirety by reference.

FIELD

The present inventive concepts relate generally to handheld computers used for processing customer purchases in a store, and more specifically, to a docking apparatus, or sled, that physically and removably couples a handheld computer and a mobile payment terminal.

BACKGROUND

A mobile checkout operation at a retail establishment such as a supermarket, department store, and so on typically requires a store employee to operate two different mobile electronic devices. The first is a mobile electronic device that performs barcode scanning and/or other point-of-sale functions. The second is a mobile payment computing device for performing electronic payment functions such as credit card processing. The two electronic devices may communicate with each other via Bluetooth™ or other electronic pairing technology. One or both mobile devices may communicate with a remote computer such as a database to perform such point-of-sale functions.

There may be instances where it is preferable for the two devices to be physically co-located and coupled to each other, and other instances where they must be separated from each other. For example, a user may be required to present only the mobile payment computing device to swipe a credit card, which is difficult to hold or use if attached to the barcode scanning device. In another example, the payment computing device may be large and bulky compared to the smaller mobile scanning device, which may have a footprint similar to a smartphone or related mobile electronic device.

BRIEF SUMMARY

In one aspect, provided is a connectivity sled for docking and undocking a mobile computer and a payment device, comprising: a first adapter plate assembly directly coupled to the payment device, including: a configuration that couples to a surface of the payment device is exposes all ports, function keys, and interfaces of the payment device; and at least one magnet; and a second adapter plate assembly directly coupled to the mobile computer, including a first portion that couples to a top surface of the mobile computer, and including at least one magnet that magnetically couples to the at least one magnet of the first adapter plate assembly.

In another aspect, provided is a method for coupling a mobile electronic device to a payment device, comprising: coupling a first adapter plate assembly directly to the payment device, the first adapter plate assembly including a configuration that couples to a surface of the payment device in a manner that exposes all ports, function keys, and interfaces of the payment device; and at least one magnet; and coupling a second adapter plate assembly directly to the mobile computer device, including: a first portion that couples to a top surface of the mobile computer, and including at least one magnet that magnetically couples to the at least one magnet of the first adapter plate assembly.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

FIGS. 4A-4J are views of various steps of a method for coupling the connectivity sled of FIGS. 1A-2 to a handheld point-of-sale computer, in accordance with some embodiments.

FIGS. 5A-5C are views of various steps of a method for coupling the connectivity sled of FIGS. 1A-2 to a mobile payment terminal, in accordance with some embodiments.

DETAILED DESCRIPTION

In brief overview, embodiments of the present inventive concept include a docking apparatus, in particular, a connectivity sled that has two parts removably coupled to each other, and each also coupled to a mobile electronic device. The two mobile devices, e.g., handheld point-of-sale computer and mobile payment terminal, each provides a feature for a store associate during operation, such as scanning and payment processing respectively. When the two devices are separated from each other, the two portions of the connectively sled remains with the respective devices. Even though the connectivity sled remains attached to the respective devices after separating the devices from each other, the sled does not interfere with the device's input/output ports, connectors, battery covers, and so on, so that a user may physically access them or otherwise allow them to perform functions in the presence of the sled.

Figure 1A:
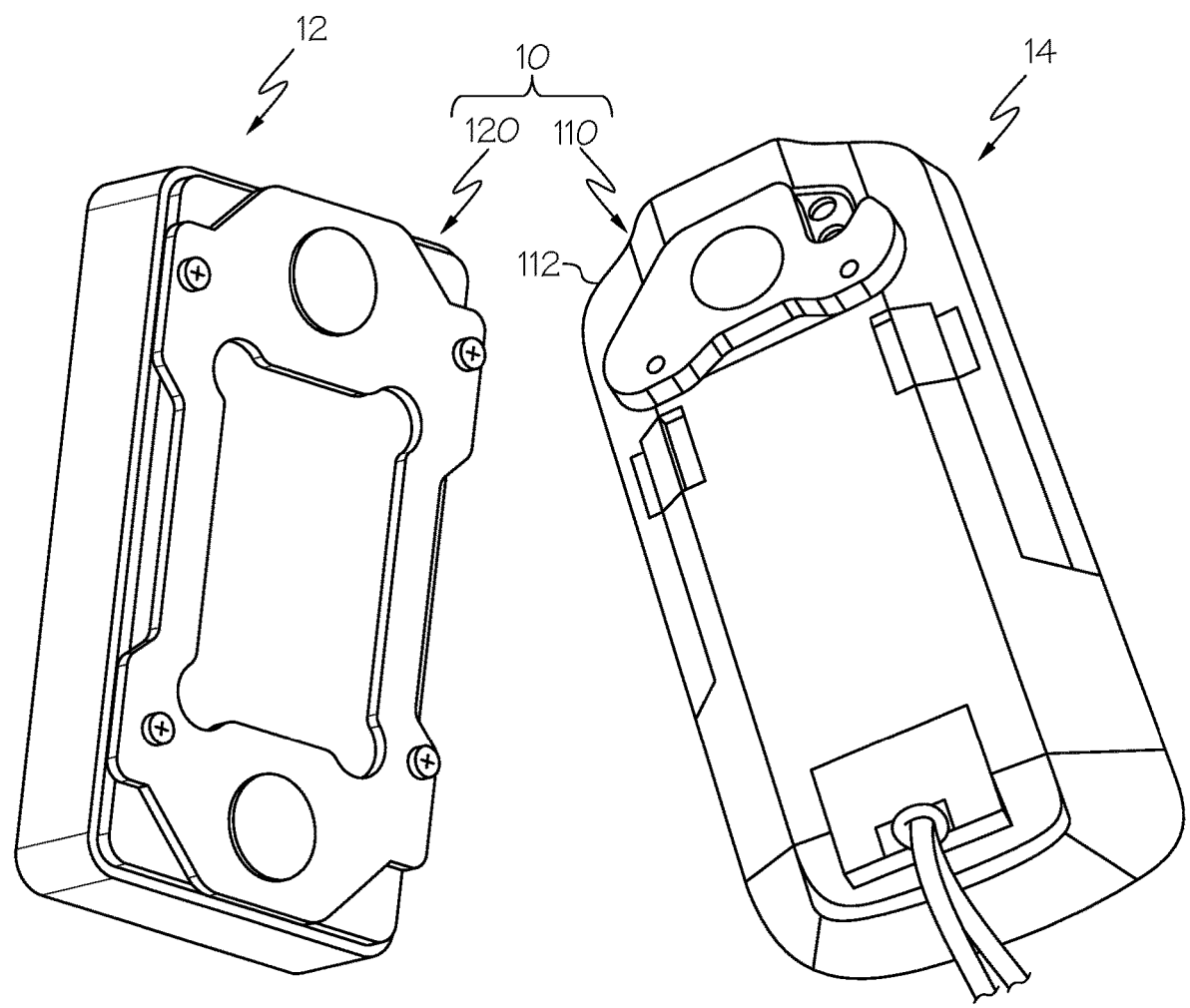
FIG. 1A is a perspective view of a connectivity sled for physically and removably engaging a handheld point-of-sale computer and a mobile payment terminal, in accordance with some embodiments.
Figure 1B:
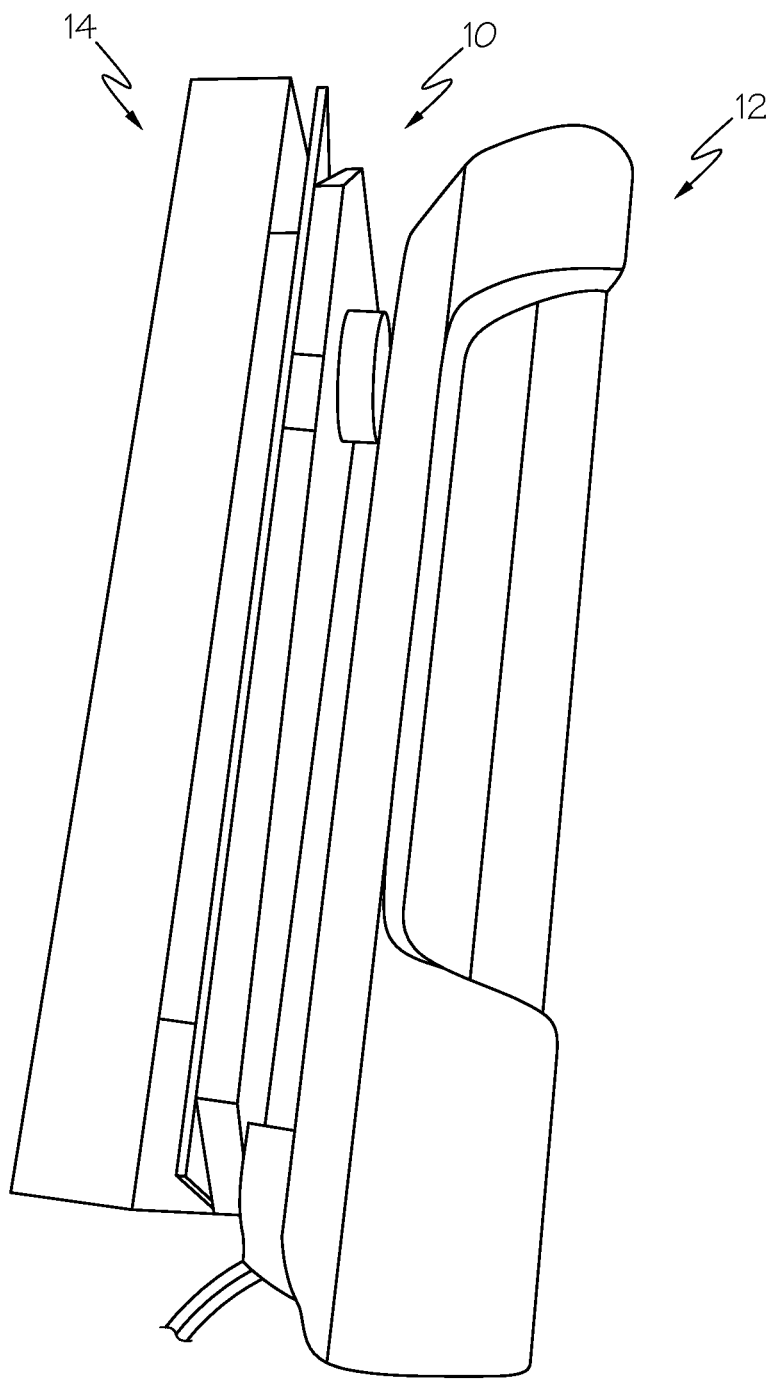
FIG. 1B is a perspective view of the connectivity sled of FIG. 1A, illustrating the connectivity sled coupling the handheld point-of-sale computer and mobile payment terminal, in accordance with some embodiments.
Figure 2:
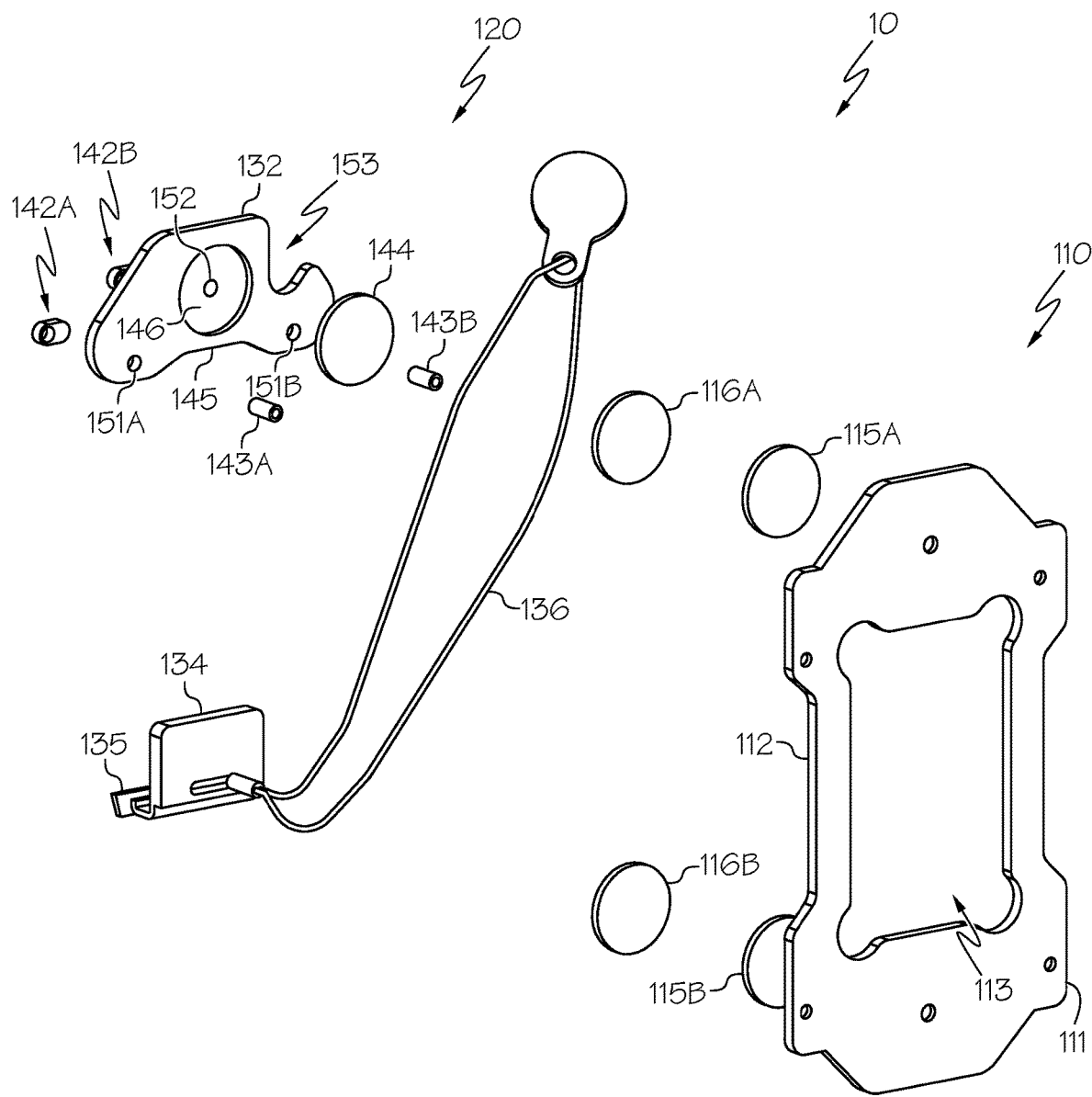
FIG. 2 is an exploded view of the connectivity sled of FIG. 1.

FIGS. 1A and 1B are perspective views of a connectivity sled 10 for a handheld retail computer 12 and a mobile payment terminal 14, in accordance with some embodiments. FIG. 2 is an exploded view of the connectivity sled 10 of FIG. 1. The connectively sled 10 can directly couple to each of a handheld retail computer 12 and a mobile payment terminal 14 having various different configurations, form factors, or other physically different dimensions. In some embodiments, the retail computer 12, also referred to as a mobile computing device or point-of-sale computer, such as a smartphone or personal digital assistant electronic device that includes a touchscreen display and network interface such as a Bluetooth®-protocol based connection. In some embodiments, the retail computer 12 is a Zebra® TC-70 computer. In some embodiments, the mobile payment terminal 14 is an Ingenico® iSMP payment device. In some embodiments, the connectively sled 10 has an overall height of 5 inches, width of 3 inches, and depth of 0.5 inches. However, other dimensions may equally apply. In some embodiments, the handheld retail computer 12 and mobile payment terminal 14 pair electronically, for example, via wireless or physical electrical connector, regardless of whether the handheld retail computer 12 and mobile payment terminal 14 are attached via the connectivity sled. In other embodiments, the handheld retail computer 12 and mobile payment terminal 14 are required to be attached via the connectivity sled 10 in order to exchange data.

In some embodiments, the connectivity sled 10 comprises a first adapter plate assembly 110 constructed and arranged for directly coupling to the mobile payment terminal 14 and a second adapter plate assembly 120 constructed and arranged for directly coupling to the handheld retail computer 12. The first adapter plate assembly 110 does not interfere with the input/output ports, connectors, card reader slots, and/or battery covers of the mobile payment terminal 14, so that a user may access such components of the mobile payment terminal 14. Similarly, the second adapter plate assembly 120 does not interfere with the input/output ports, connectors, and/or battery covers of the retail computer 12, so that a user may access such components of the retail computer 12.

As shown in FIGS. 2 and 6A-6C, the first adapter plate assembly 110 may be formed of a single block or mold of rigid or semi-rigid material forming a frame, such as metal, plastic, composite, or the like. A first side 111 of the first adapter plate assembly 110 is constructed and arranged to directly attach to the rear side of the mobile payment terminal 14. A second side 112 of the first adapter plate assembly 110 includes at least one magnet 115A, B (generally, 115) constructed and arranged for magnetically coupling with the second adapter plate assembly 120. In some embodiments, the magnet(s) 115 are rare earth magnets, but not limited thereto. In some embodiments, the magnets 115 are coin-shaped, cylindrical, or other configuration permitting the magnets 115 to operate to magnetically couple with the second adapter plate assembly 120, which in turn is coupled to a different mobile electronic device than the device 14 to which the first adapter plate assembly 110 is removably coupled.

In some embodiments, a first magnet 115A is coupled to a top region of the second side 112 of the first adapter plate assembly 110 and a second magnet 115B is coupled to a bottom region of the second side 112 of the first adapter plate assembly 110. In some embodiments, the second side 112 of the first adapter plate assembly 110 includes a hole, cavity, or the like constructed and arranged for receiving and holding in place each magnet 115. In other embodiments, the magnets 115 are coupled directly to the rear surface 112 of the first adapter plate assembly 110, for example, using an adhesive or coupling device. In some embodiments, the surface of the magnet 115 is co-planar with the surface 112 of the plate assembly. In some embodiments, an ultra-high molecular-weight (UHMW) material 116A, B (generally, 116) may be used as an adhesive pad or the like for positioning over the magnets 115.

As further shown in FIGS. 2 and 6A-6C, the first adapter plate assembly 110 may include a center hole 113. In some embodiments, as shown in FIG. 2, the center hole 113 is shaped for specific configurations of the mobile payment terminal 14, for example, having a central region and a plurality of lobe or rounded corners for exposing a region of the mobile payment terminal 14.

The second adapter plate assembly 120 includes a top bracket 132 and a bottom locking bracket 134 constructed and arranged to attach to a top and bottom portion of a handheld retail computer 12. This feature permits the second adapter plate assembly 120 to remain with the handheld retail computer 12 during operation, regardless of whether the handheld retail computer 12 is separate from or coupled to a mobile payment computer 14. Also, the second adapter plate assembly 120 is constructed and arranged to permit access to the rear of the handheld retail computer 12 without covering or obscuring ports, sensors, battery cover, charging port, function keys, and interfaces or other relevant elements of the handheld retail computer 12.

Figure 3:
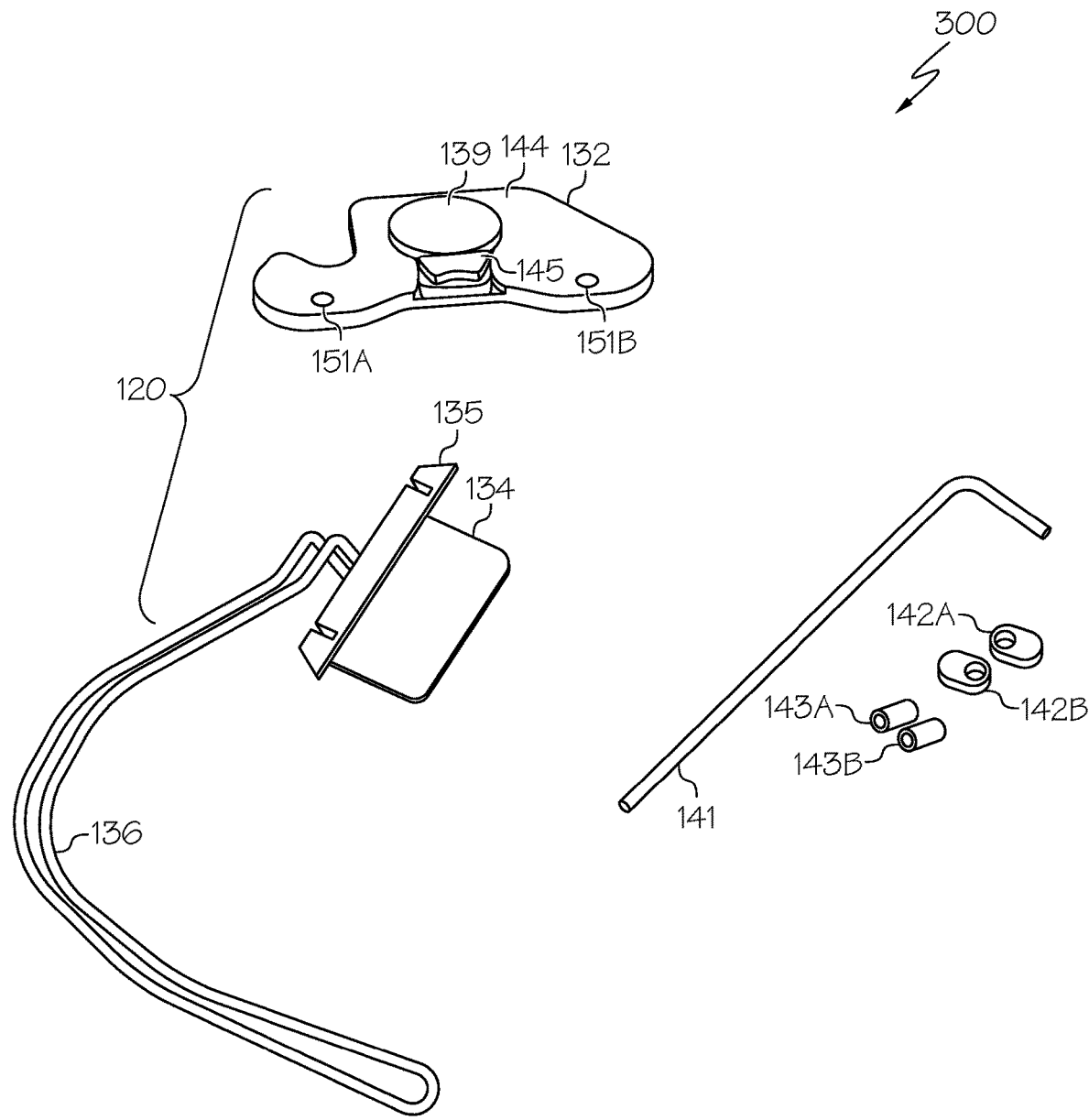
FIG. 3 is a perspective view of a kit for attaching an adapter plate assembly of a connectivity sled to a handheld point-of-sale computer, in accordance with some embodiments.

The top bracket 132 includes a cavity 146, or indentation, depression, or the like, constructed and arranged for receiving a magnet 144. As shown in FIG. 3, a protective cover 139 may be positioned over the magnet 144 prior to use of the magnet 144. In some embodiments, the protective cover 139 may be formed of the same UHMW material as the buffers 116 for the magnets 115 of the first adapter plate assembly 110. The magnet 144 of the top bracket 132 is constructed to magnetically couple to a magnet 115A of the first adapter plate assembly 110 coupled to the mobile payment terminal 14. In other embodiments, the top bracket 132 has magnetic properties, and therefore, does not include a magnet 144. These magnet pairs 115, 144 may be configured attract for a strong hold but repel when twisted 120 or 180 degrees for an easy release.

Figure 4A:
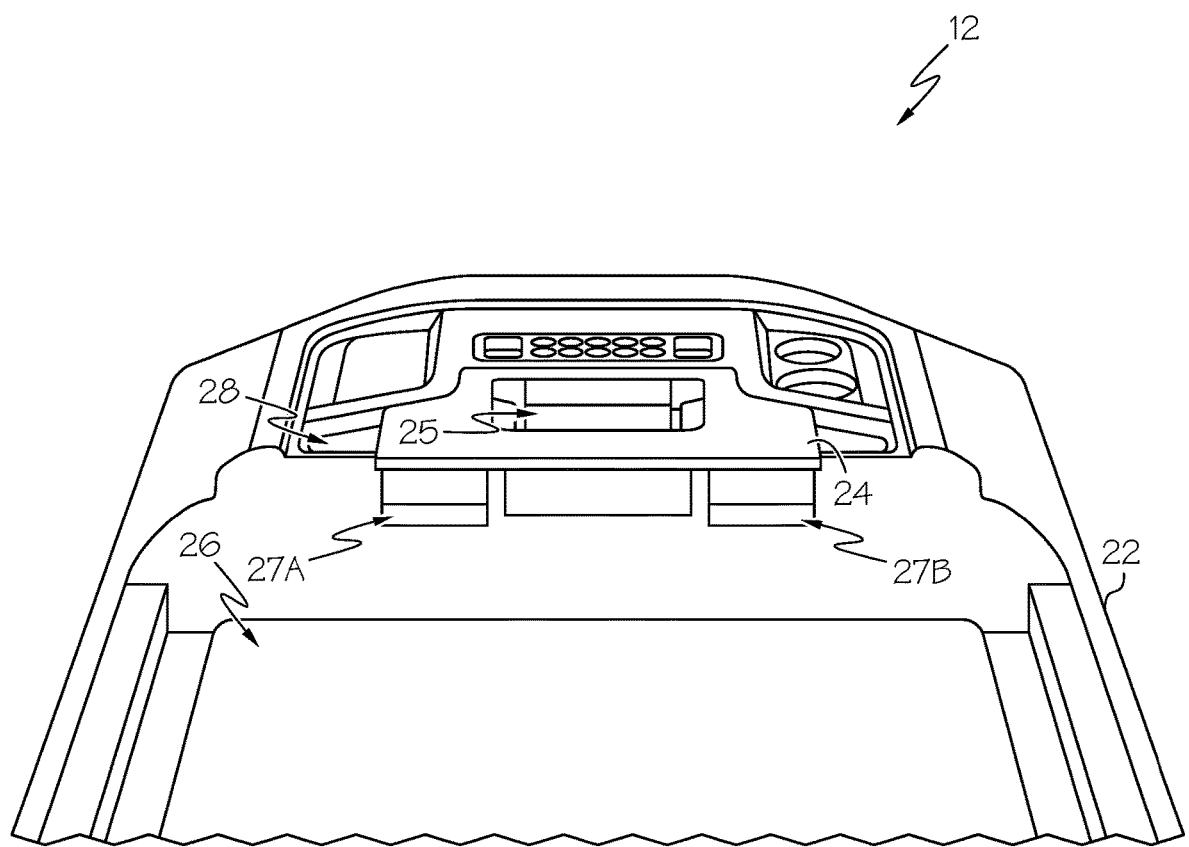
Figure 4B:
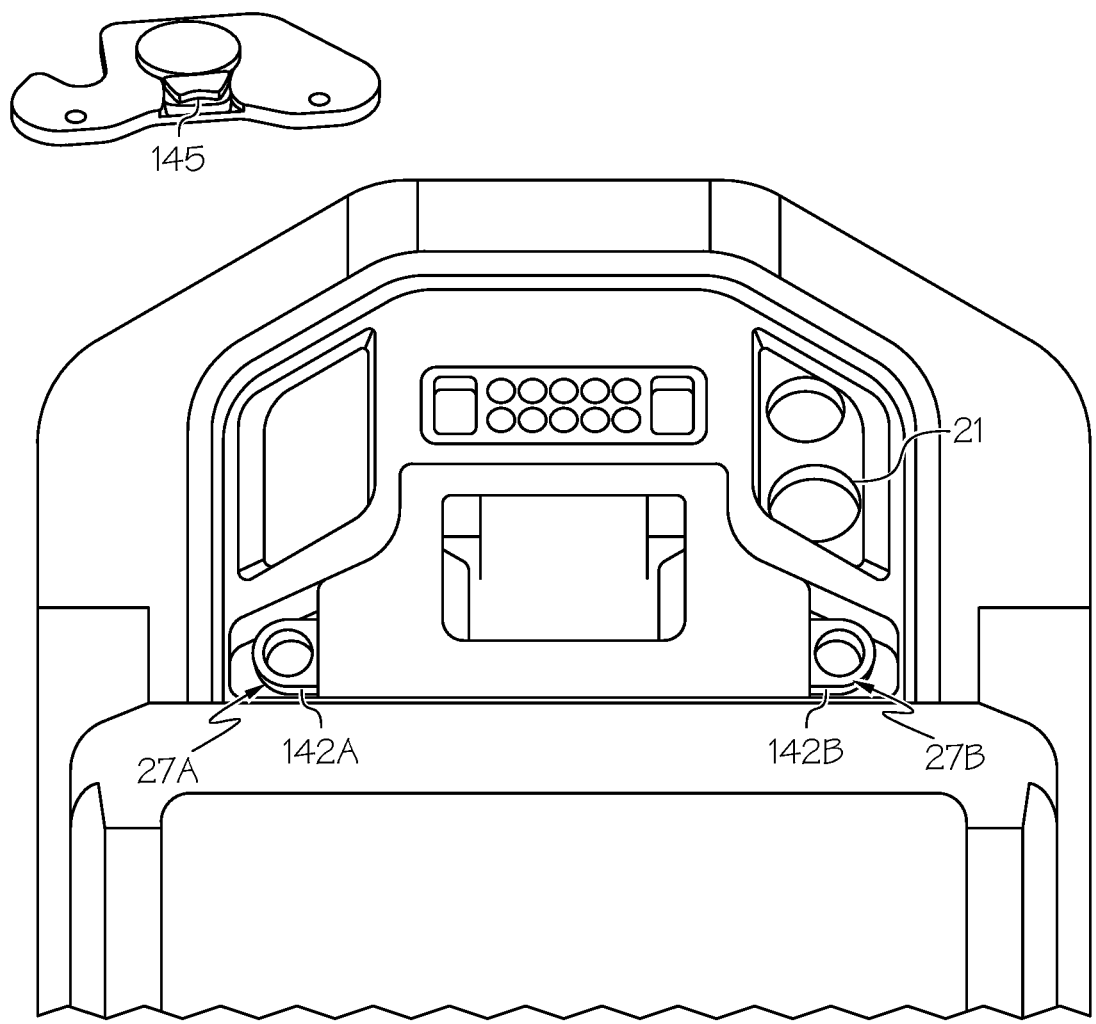
Figure 4C:
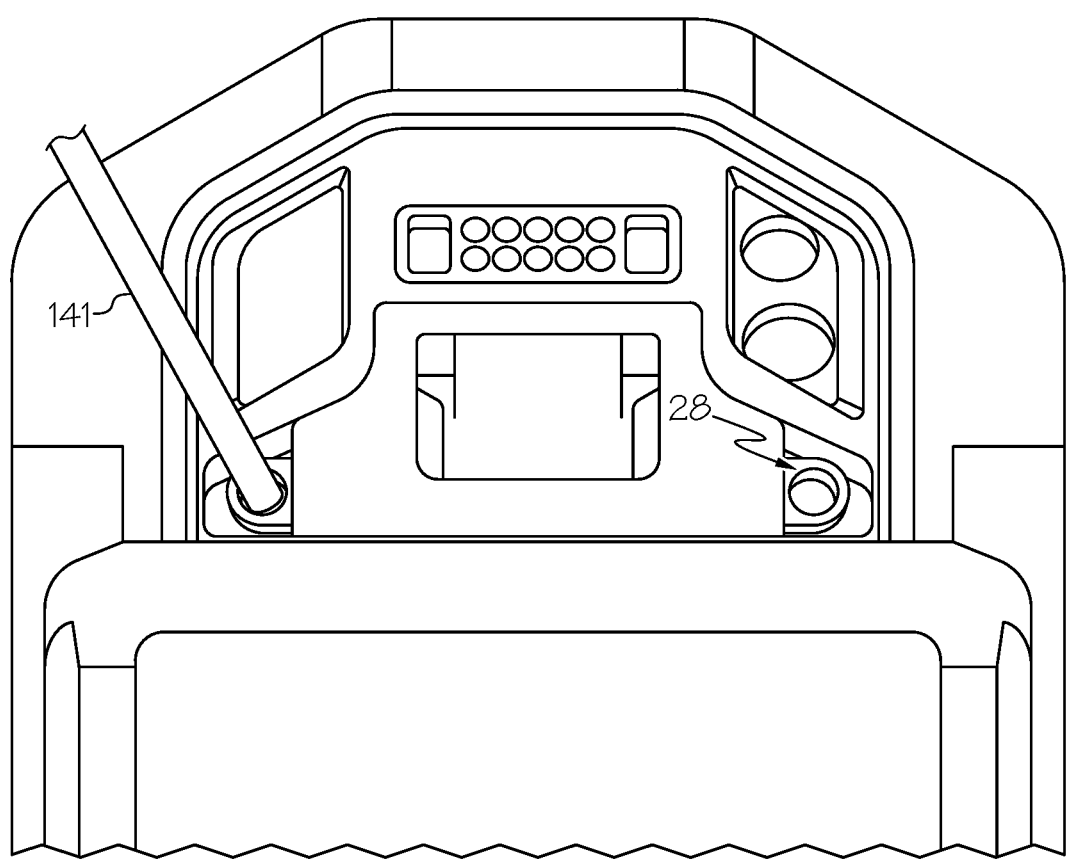
Figure 4D:
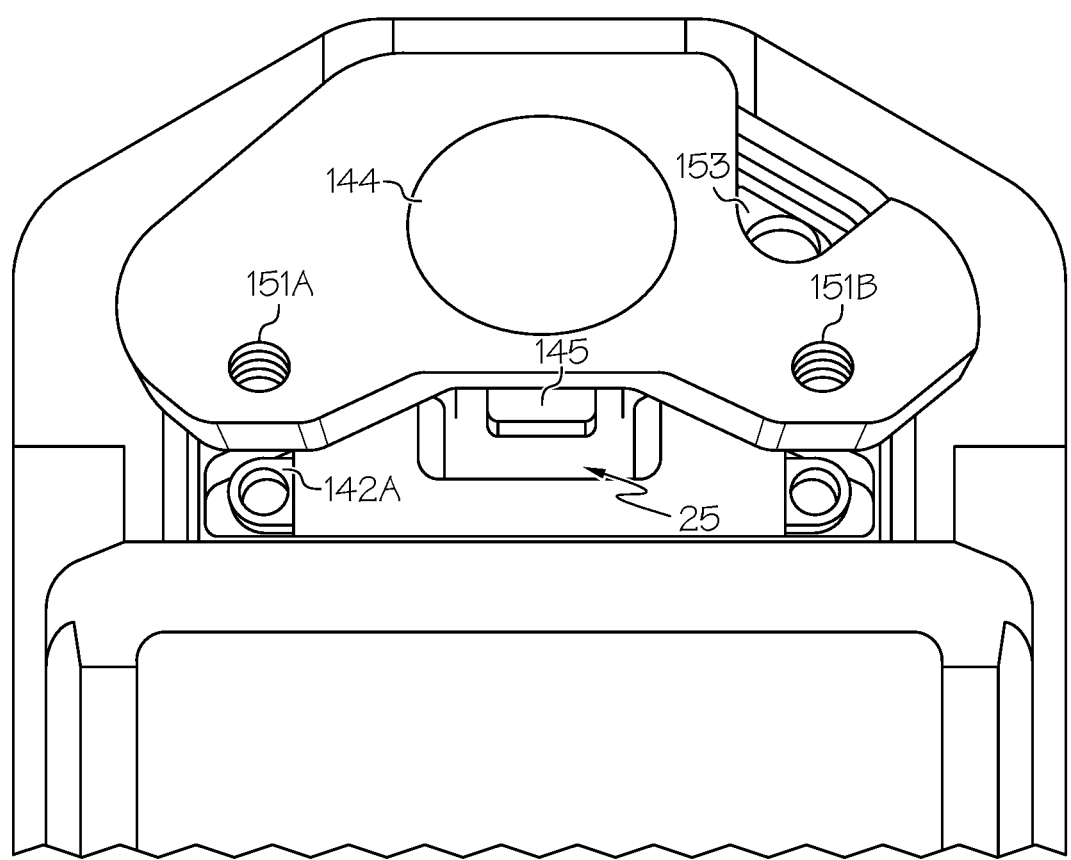

As shown in FIGS. 4D and E, the top bracket 132 includes holes 151A, 151B (generally, 151) extending through lobe portions at a bottom region of the top bracket 132 that align with the oval-shaped nuts 142A, 142B, respectively in the openings 27A, 27B, respectively of the compartment 28 of the handheld retail computer 12 (see FIG. 4A). The top bracket 132 can include a hole 152 in a center region of the cavity 146 for receiving a screw, hook or other coupling mechanism for further coupling the top bracket 132 to the handheld retail computer 12, for example, prior to inserting a magnet 144 into the cavity 146. In some embodiments, the magnet 144 when inserted in the cavity 146 is flush with the surface of the bracket 132. In other embodiments, the magnet 144 has a thickness greater than a depth of the cavity 146 so as to protrude from the bracket 132. In addition to the bottom lobes, the top bracket 132 may be shaped at a side region 153 for exposing a sensor, lens, or other relevant component 21 of the handheld retail computer 12 when the top bracket 132 is coupled to the computer 12. The side region 153 may have other configurations, shapes, or the like that equally apply for various mobile devices.

In some embodiments, the top bracket 132 includes a tooth 145 or related protrusion extending from the rear surface of the top bracket 132 which is configured for insertion into a cavity 25 of a metal plate 24 of the computer 12 (see also FIG. 4D).

Figure 4E:
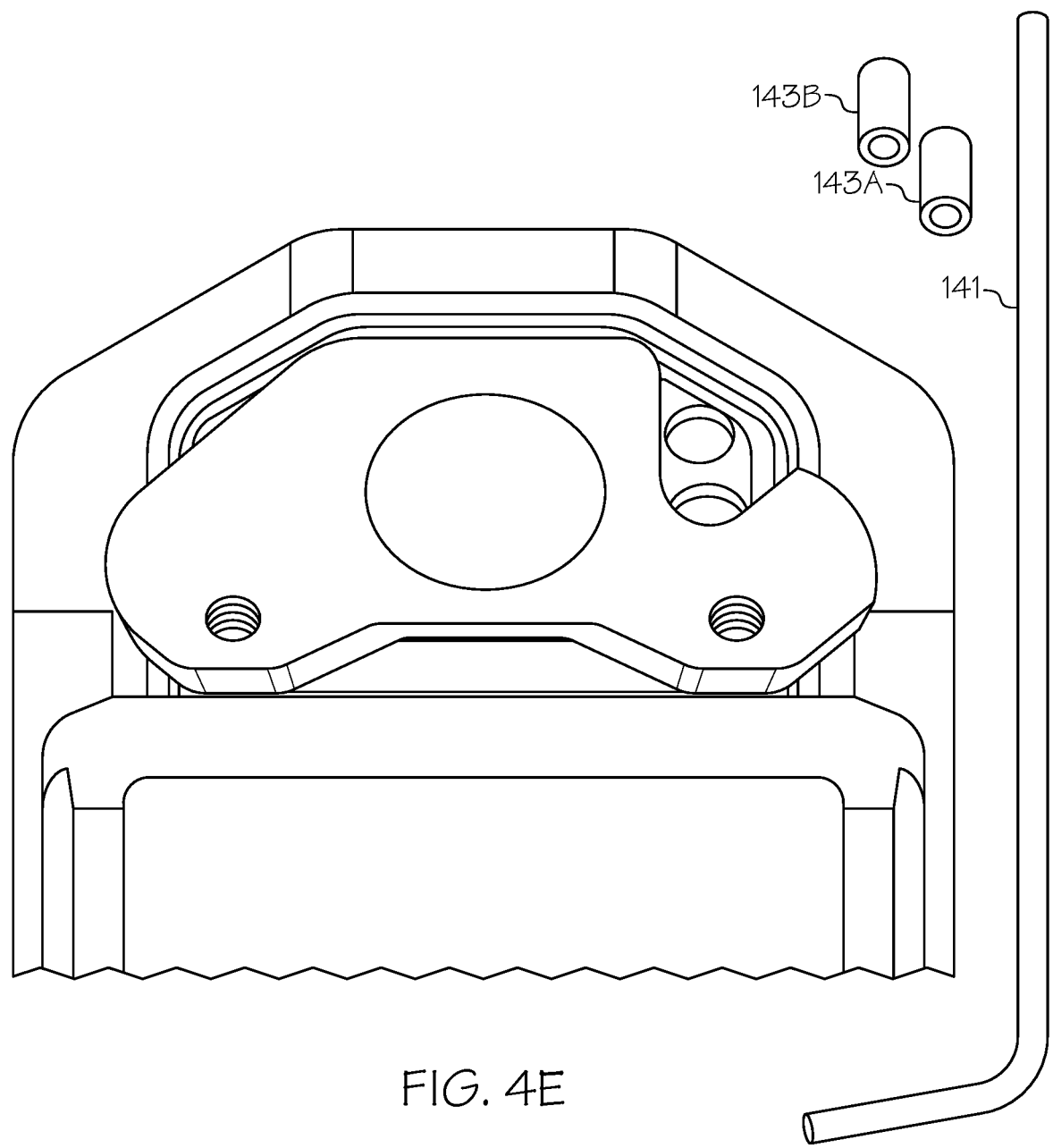
Figure 4F:
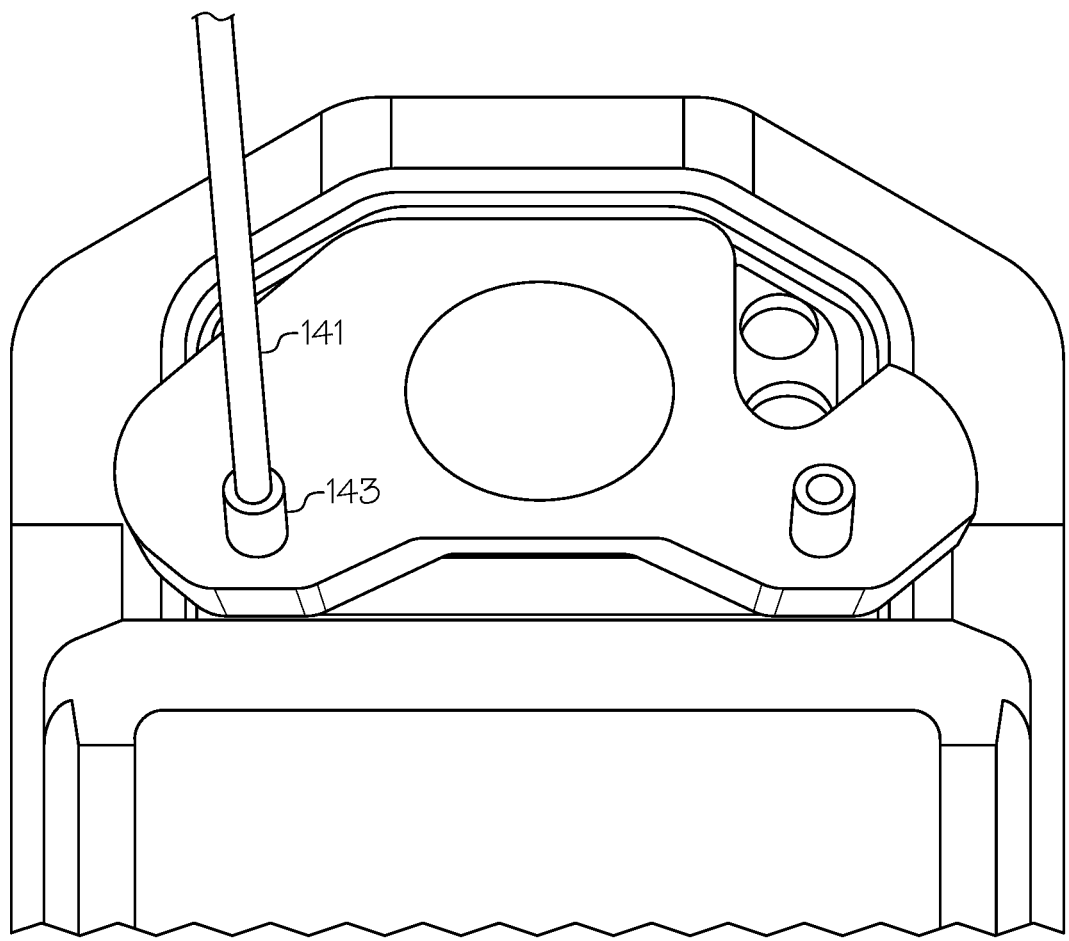
Figure 4G:
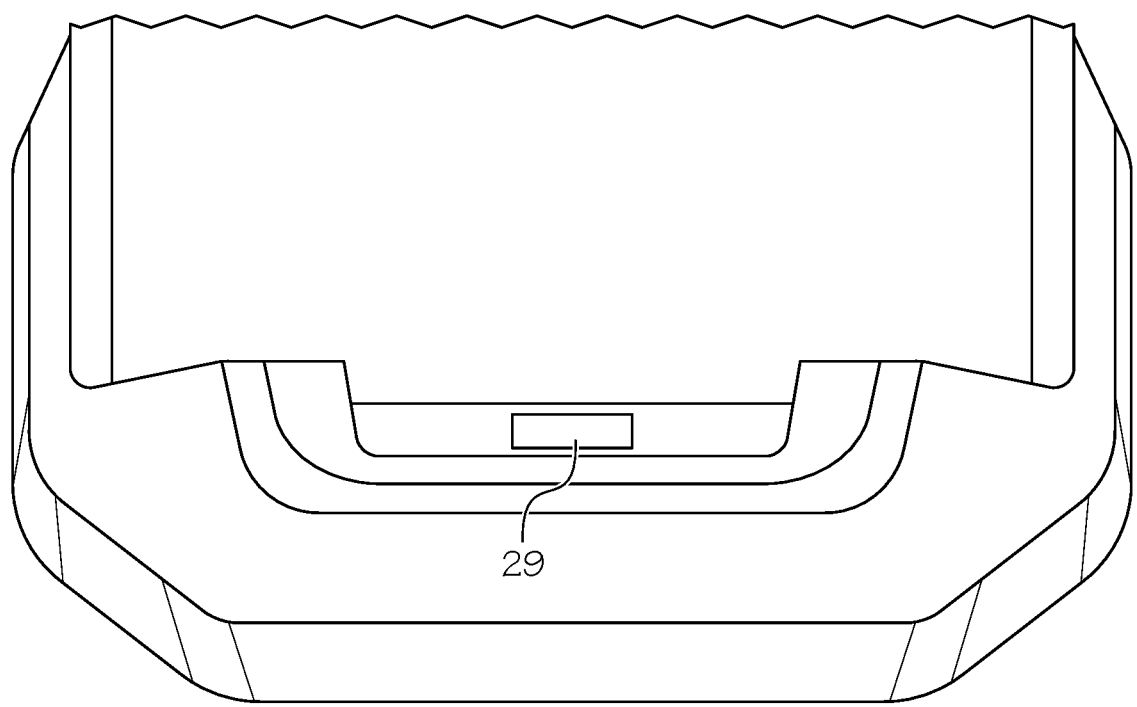
Figure 4H:
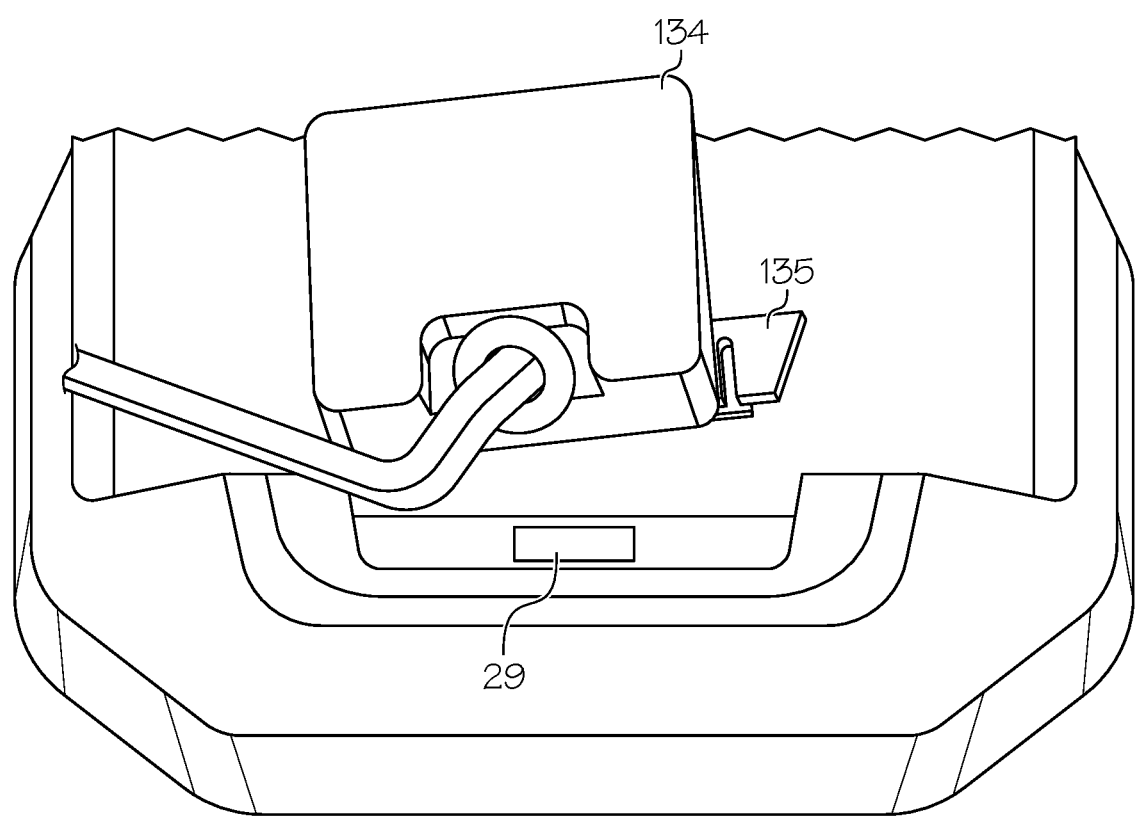
Figure 41:
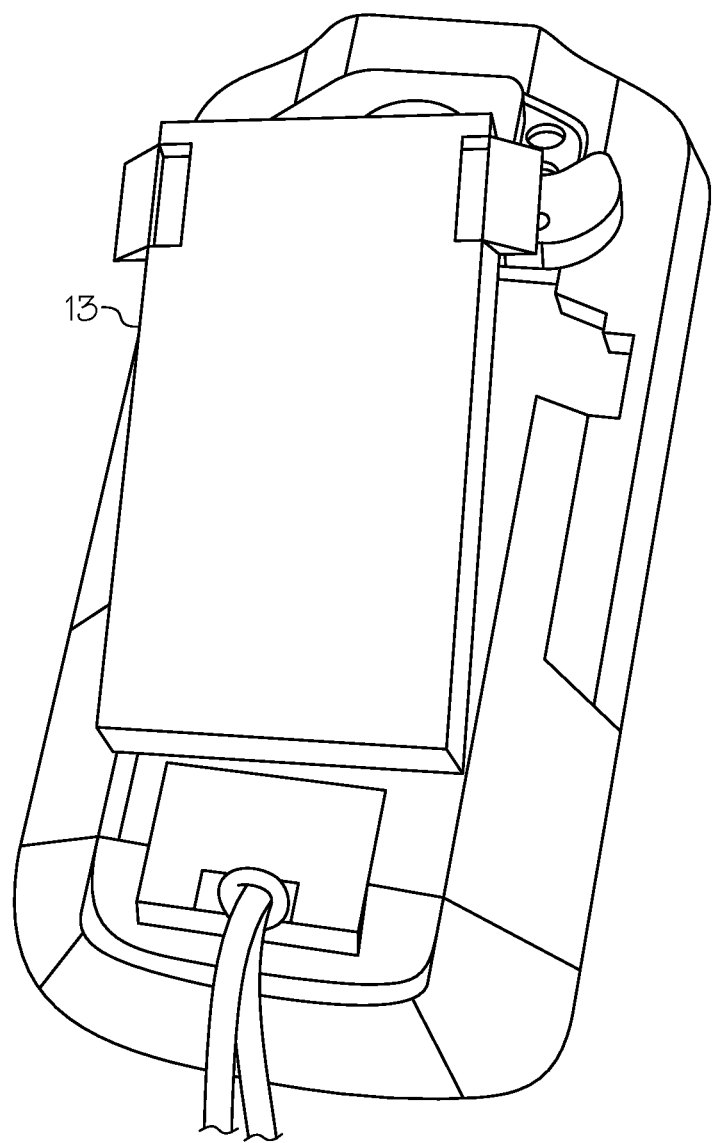

The bottom locking bracket 134, also referred to as a bottom magnet plate, is constructed and arranged for coupling to a bottom slot or cavity 29 in the handheld retail computer 12, for example, shown in FIG. 4H. The bottom locking bracket 134 may include a clip 135 or portion thereof for insertion under a region of the computer 12 to hold the bottom locking bracket 134 in place against the computer 12 on a same side of the computer 12 as the top bracket 132.

In some embodiments, the bottom locking bracket 134 includes a strap 136 or the like. The bottom locking bracket 134 is magnetic and constructed to magnetically couple to a magnet 115B of the first adapter plate assembly 110. In some embodiments, the body of the bottom locking bracket 134 has a same magnetic polarity as the magnet 144 of the top bracket 132 and the magnets 115A, B (generally, 115) of the first adapter plate assembly 110 has an opposite polarity for magnetically attracting the top bracket 132 and bottom locking bracket 134, respectively.

FIG. 3 is a perspective view of a kit 300 for attaching the second adapter plate assembly 120 of a connectivity sled 10 to the handheld retail computer 12 of FIGS. 1 and 2.

In some embodiments, the kit 300 includes the top bracket 132, bottom magnet plate 134, and strap 136 of the second adapter plate assembly 120. In addition, the kit 300 includes a tool and hardware package comprising an elongated tool 141, two oval-shaped nuts 142A, 142B (generally, 142), and set screws 143A, B for attaching the second adapter plate assembly 120 to the handheld retail computer 12.

FIGS. 4A-4J are views of various steps of a method for coupling the connectivity sled 10 of FIGS. 1A-2, in particular, the second adapter plate assembly 120, to a handheld retail computer 12, in accordance with some embodiments.

As shown in FIG. 4A, the handheld retail computer 12 has a rear side 22 to which the second adapter plate assembly 120 can attach. A top region of the rear side 22 has a metal plate 24 positioned in a compartment 28 above a cavity 26 in which a battery (not shown) is positioned during normal operation of the computer 12 but removed as part of the installation of the second adapter plate assembly 120. In removing the battery, a first opening 27A and second opening 27B under the metal plate 24 is exposed from the cavity 26.

As shown in FIG. 4B, a first nut 142A is inserted via the first opening 27A into a region under one side of the metal plate 24 so that a threaded portion of the nut 142A is displayed, while the body of the nut 142B is securely positioned under the metal plate 24. Similarly, a second nut 142B is inserted via the second opening 27B into a region under the other side of the metal plate 24 so that a hole of the nut 142B is displayed, while the body of the nut 142B is securely positioned under the metal plate 24.

As shown in FIG. 4C, the elongated tool 141, for example, a hex wrench (not shown in FIG. 4C), may be inserted into the hole of one or both nuts 142 and adjust the nuts 142 to be properly positioned in the compartment 28 with the metal plate 24. For example, grooves may extend laterally from the compartment 28 and the nuts 142 may be inserted in the lateral grooves so that the nuts 142 extend laterally from the plate 24 and exposed via holes formed by the grooves and sides of the metal plate 24.

As shown in FIG. 4D, the top bracket 132 of the second adapter plate assembly 120 is attached to the rear side 22 of the handheld retail computer 12 by inserting the tooth 145 extending from the rear side of the top bracket 132 into the cavity 25 of the metal plate 24 to extend under the plate 24. A protective cover 139 positioned on the adhesive covering the rear side of the magnet 144 in the cavity 142 in the top bracket 132 (see FIG. 2) can be removed to expose the magnet adhesive. The front surface of the magnet 144 is preferably flush with the front surface of the top bracket 132 while the rear surface having the adhesive extends or protrudes from the rear of the top bracket 132 for insertion into the cavity 25 of metal plate. The rear side of the magnet 144 having the adhesive is inserted into the cavity 142 to abut an interior surface. After the top bracket tooth 145 is positioned in or otherwise clipped to the metal plate 24, a force can be applied to the top bracket 132, for example, via the magnet 144 so that the adhesive binds the magnet 144 and a surface of the handheld retail computer 12 through the metal plate cavity 25. As a result, as shown in FIG. 4E, the top bracket 132 is held in place by the tooth 45 and the magnet 144 against the plate 24.

As also shown in FIG. 4E, a user can align the holes 151 in the top bracket 132 and the threaded holes in the oval-shaped nuts 142A, 142B extending from the metal plate 24. In doing, as shown in FIG. 4F, a user can use the hex tool 141 or the like to insert the two threaded set screws 143A, B, respectively, into the threaded holes in the nuts via the openings 27A, 27B, respectively of the compartment 28 of the handheld retail computer 12.

Before or after the top bracket 132 is attached to the device 12, the bottom locking bracket 134 can be attached to the device 12. As shown in FIGS. 4G and 4H, a bottom portion of a handheld retail computer 12 preferably has a bottom slot or cavity 29 into which a clip 135, or related protrusion, hook, or the like of the bottom locking bracket 134 may be inserted. The clip 135 is constructed for directly coupling with the retail computer 12.

Figure 4J:
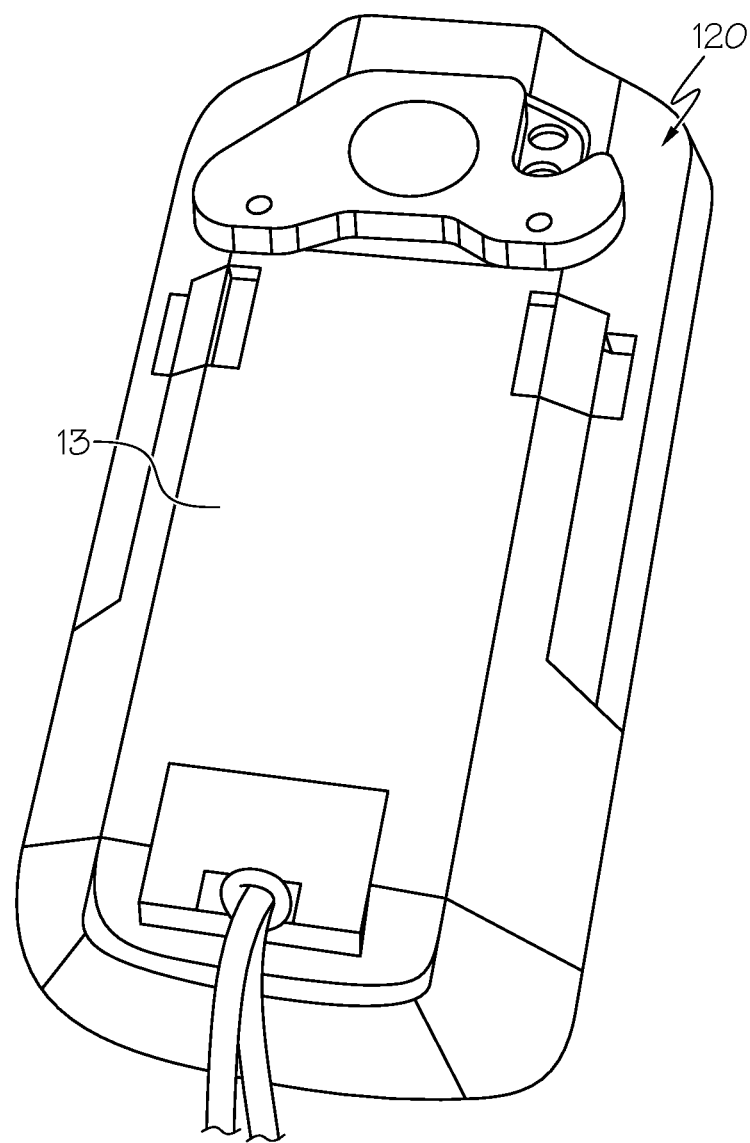
Figure 6:
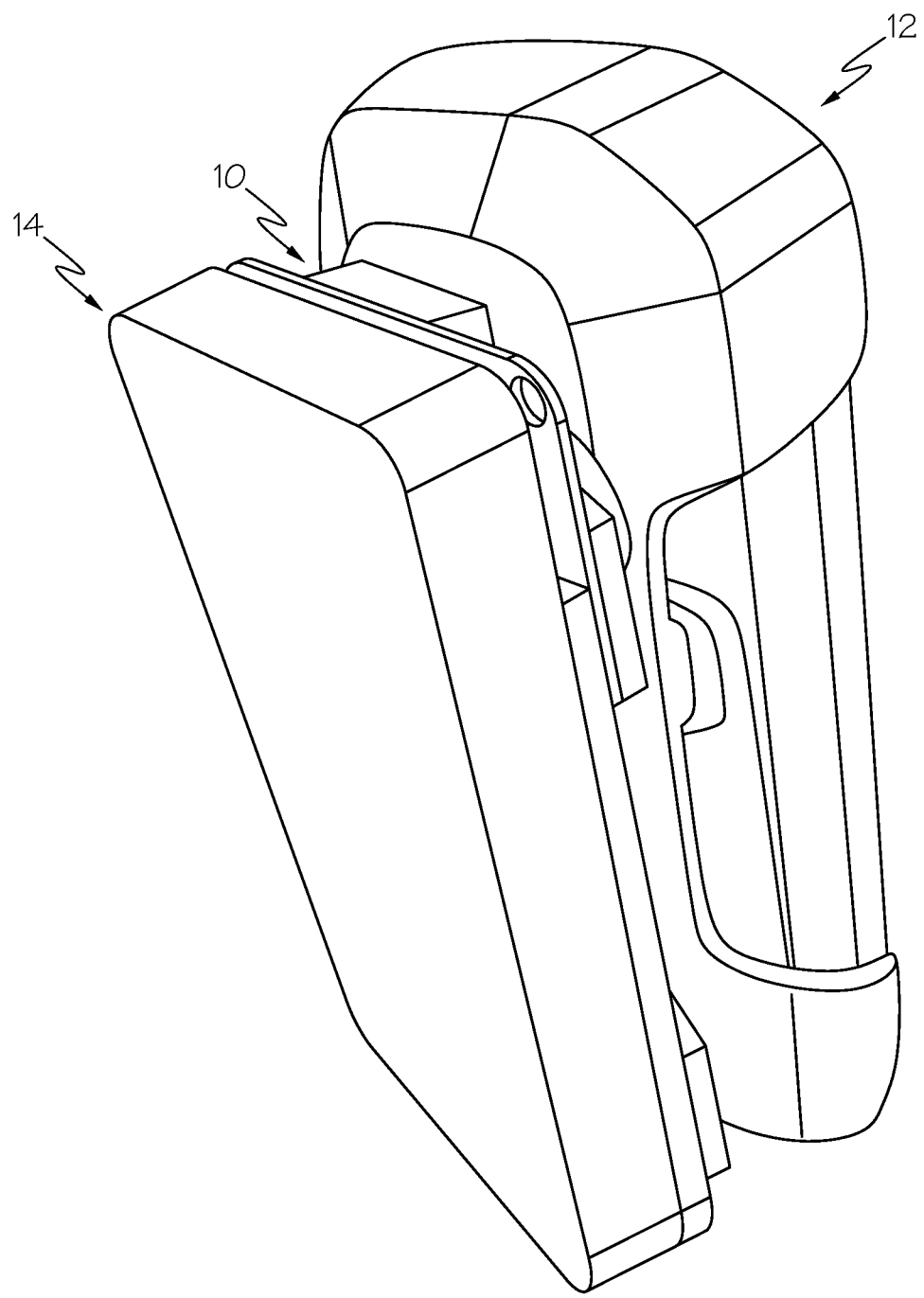
FIG. 6 is a perspective view of a handheld point-of-sale computer and mobile payment terminal each having an adapter plate assembly of a connectivity sled and coupled together by the adapter plate assemblies, in accordance with some embodiments.

As shown in FIGS. 4I and 4J, after the top bracket 32 and bottom bracket 34 are attached to the handheld retail computer 12, a rear cover 13 such as a battery previously removed can be reattached to the computer 12. Subsequently, the handheld retail computer 12 is ready for operation and for coupling to the first adapter plate assembly 110 attached to the mobile payment terminal 14.

FIGS. 5A-5C are views of various steps of a method for coupling the connectivity sled 10 in particular, the first adapter plate assembly 110, to a mobile payment terminal 14, in accordance with some embodiments.

As shown in FIGS. 5A and 5B, the mobile payment terminal 14 has a rear side 52 to which the first adapter plate assembly 110 can attach. In some embodiments, the rear side 52 of the mobile payment terminal 14 has a plurality of threaded and/or counterbored holes 53 for receiving screws 162, respectively. A screwdriver or hex wrench, for example, shown in FIGS. 3, 4E, and 4F, may be used to rotate the screws 162 in the holes 53 during assembly. In some embodiments, the screws 162 are M2 socket cap screws that screw through counterbored holes 53 on the adapter 110 into bottoming tapped holes on the device 14. To remove the bracket from the device, a user can remove the screws by turning each screw counterclockwise. Although screws 162 are shown, other coupling mechanisms may equally apply for securely attaching the rear side 52 of the mobile payment terminal 14 to a surface of a side 112 of the first adapter plate assembly 110

In some embodiments (not shown) a protective cover similar to cover 139 in FIG. 3 may cover the magnets 115A, B inserted in the cavities 117A, B in the rear side 52. The front surface of the magnet 144 is preferably flush with the surface of the rear side 52 or protrudes from the rear side 52. The rear side of the magnet 144 having the adhesive is inserted into the cavities 117A, B to abut an interior surface.

Subsequently, the mobile payment terminal 14 is ready for operation and for coupling to the second adapter plate assembly 120 attached to the computer 12 as shown in FIG. 5C.

The connectivity sled 10 may operate in any number of different retail applications and environments. For example, a store associate at a store may perform an audit on a customer's purchase by reviewing purchase receipts or for assisting customers in returning merchandise. In some scenarios, a customer may not have a proof of purchase such as a receipt on hand. Here, the store associate may use the connectivity sled 10 to detach a mobile payment device and use it to perform a credit card swipe to locate the receipt electronically. In another example, the store associate may discover that a customer forgot to check out the case of bottled water at the bottom of the customer's shopping cart. The associate can again detach the mobile payment device via the connectivity sled 10 to add the bottled water to the purchase. In another example, a customer service manager at the front of the store may observe the checkout lanes and assist customers who are waiting line, for example, as another resource at the checkout. Here, the manager can detach the mobile payment device via the connectivity sled 10 to perform checkout functions, then reconnect the payment device via the connectivity sled 10 to a TC70 computer or the like also in possession by the manager.

The foregoing and other features and advantages of the invention will be apparent to those of ordinary skill in the art from the following more particular description of the invention and the accompanying drawings.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:

1. A connectivity sled for docking and undocking a mobile computer and a payment device, comprising:
    a first adapter plate assembly directly coupled to the payment device, including:
        a configuration that couples to a surface of the payment device in a manner that exposes all ports, function keys, and interfaces of the payment device; and
        at least one magnet, wherein the at least one magnet of the first adapter plate assembly comprises a first magnet affixed to a top region of the first adapter plate assembly and a second magnet affixed to a bottom region of the first adapter plate assembly;
    a second adapter plate assembly directly coupled to the mobile computer device, including:
        a first portion that couples to a top surface of the mobile computer, and including at least one other magnet of the second adapter plate assembly that magnetically couples to the at least one magnet of the first adapter plate assembly.

2. The connectivity sled of claim 1, wherein the second adapter plate assembly further includes a second portion at a bottom of the mobile computer for attaching a wrist strap.

3. The connectivity sled of claim 1, wherein the at least one magnet of the first adapter plate assembly and the at least one other magnet of the second adapter plate assembly allow a docking and undocking of the mobile computer and payment device without a manual switch or clip actuator.

4. The connectivity sled of claim 1, wherein the mobile computer and payment device pair with each other to communicate via wireless or wired connection when docked or undocked to each other.

5. The connectivity sled of claim 1, wherein the mobile computer device is a Zebra® TC-70 computer, and the payment device is an Ingenico® iSMP payment device.

6. The connectivity sled of claim 1, wherein the first adapter plate assembly is constructed and arranged to permit access by a user to at least one of an input/output port, connector, card reader slot, or battery cover of the payment device.

7. The connectivity sled of claim 1, wherein the at least one magnet is positioned in a hole of the first adapter plate assembly so that a surface of the at least one magnet is substantially co-planar with the surface of the first adapter plate assembly.

8. The connectivity sled of claim 1, wherein the first adapter plate assembly includes a center hole having a central region and a plurality of lobe or rounded corners.

9. The connectivity sled of claim 1, wherein the first portion of the second adapter plate assembly includes a top bracket having a tooth extending from a rear surface of the top bracket configured for insertion into a cavity of the mobile computer.

10. A method for coupling a mobile electronic device to a payment device, comprising:
    coupling a first adapter plate assembly directly to the payment device, the first adapter plate assembly including:
        a configuration that couples to a surface of the payment device in a manner that exposes all ports, function keys, and interfaces of the payment device; and
        at least one magnet, wherein the at least one magnet of the first adapter plate assembly comprises a first magnet affixed to a top region of the first adapter plate assembly and a second magnet affixed to a bottom region of the first adapter plate assembly; and
    coupling a second adapter plate assembly directly to the mobile computer device, including:
        a first portion that couples to a top surface of the mobile computer, and including at least one other magnet of the second adapter plate assembly that magnetically couples to the at least one magnet of the first adapter plate assembly.

11. The method of claim 10, further including positioning a second portion at a bottom of the mobile computer for attaching a wrist strap.

12. The method of claim 10, wherein the at least one magnet allows a docking and undocking of the mobile computer and payment device without a manual switch or clip actuator.

13. The method of claim 10, further comprising pairing the mobile computer and payment device with each other to communicate via wireless or wired connection when docked or undocked to each other.

14. The method of claim 10, wherein the mobile computer device is a Zebra® TC-70 computer, and the payment device is an Ingenico® iSMP payment device.

15. The method of claim 10, wherein the first adapter plate assembly is constructed and arranged to permit access by a user to at least one of an input/output port, connector, card reader slot, or battery cover of the payment device.

16. The method of claim 10, wherein the at least one magnet is positioned in a hole of the first adapter plate assembly so that a surface of the at least one magnet is substantially co-planar with the surface of the first adapter plate assembly.

17. The method of claim 10, further comprising constructing the first adapter plate assembly to include a center hole having a central region and a plurality of lobe or rounded corners.

18. The method of claim 10, further constructing the first portion of the second adapter plate assembly to include a top bracket having a tooth extending from a rear surface of the top bracket configured for insertion into a cavity of the mobile computer.

\* \* \* \* \*